United States Patent
Lakey

(10) Patent No.: US 7,654,754 B1
(45) Date of Patent: Feb. 2, 2010

(54) CAMERA HAVING IMPROVED CAMERA CUSHION AND SEAL

(76) Inventor: James B. Lakey, 1905 Beech Cove Dr., Cleveland, TN (US) 37312

(*) Notice: Subject to any disclaimer, the term of this patent is extended or adjusted under 35 U.S.C. 154(b) by 342 days.

(21) Appl. No.: 11/593,759

(22) Filed: Nov. 7, 2006

Related U.S. Application Data

(60) Provisional application No. 60/734,351, filed on Nov. 7, 2005.

(51) Int. Cl.
G03B 19/12 (2006.01)
(52) U.S. Cl. .................. 396/354; 348/373; 348/842; 396/352; 396/358
(58) Field of Classification Search .......... 396/354, 396/352, 355, 358, 536; 359/223, 513, 848; 248/466; 348/373–375, 842
See application file for complete search history.

(56) References Cited

U.S. PATENT DOCUMENTS

| | | | | | |
|---|---|---|---|---|---|
| 3,955,206 | A | * | 5/1976 | Hashimoto | 396/358 |
| 4,253,754 | A | * | 3/1981 | Ishihara | 396/355 |
| 4,491,389 | A | * | 1/1985 | Coburn, Jr. | 359/848 |
| 4,624,542 | A | * | 11/1986 | Ikeno et al. | 396/447 |
| 5,734,428 | A | * | 3/1998 | Suda et al. | 348/341 |
| 5,946,501 | A | * | 8/1999 | Hayakawa | 396/25 |
| 6,426,777 | B1 | * | 7/2002 | Sato | 348/373 |
| 7,315,336 | B2 | * | 1/2008 | North et al. | 349/58 |
| 2005/0219399 | A1 | * | 10/2005 | Sato et al. | 348/340 |
| 2006/0132888 | A1 | * | 6/2006 | Kim et al. | 359/290 |

* cited by examiner

*Primary Examiner*—W. B. Perkey
*Assistant Examiner*—Linda B Smith
(74) *Attorney, Agent, or Firm*—Stephen J. Stark; Miller & Martin PLLC

(57) ABSTRACT

A silicon-like resilient member is utilized for at least one of a mirror cushion and a light seal. This new member is believed to resist flaking and other problems associated with traditional foam members.

13 Claims, 2 Drawing Sheets

CAMERA HAVING IMPROVED CAMERA CUSHION AND SEAL

CLAIM OF PRIORITY

This application claims the benefit of U.S. Provisional Patent Application No. 60/734,351 filed Nov. 7, 2005.

FIELD OF THE INVENTION

The present invention relates to a camera having improved camera cushion(s) and/or seals.

BACKGROUND OF THE INVENTION

For at least the past twenty years, if not the past forty years, single lens reflex cameras (SLR's), twin lens reflex cameras (TWR's) and now digital cameras are often provided with foam components for at least some uses. In digital cameras as well as SLR cameras, foam is often used for a cushion or a bumper which is impacted by a camera mirror when the camera mirror swivels out of the way during image capture on film or a sensor plane depending upon the type of camera utilized. This foam bumper has been found to have a history of degradation even under normal working conditions which often results in crumbled foam being displaced within the body of a camera. Even if not used, this foam bumper normally degrades to failure over a period of time in many instances. Heat and cold can also accelerate failure. This same foam has been used for other cushions in cameras such as for range finder cushions.

In single lens reflex cameras, foam is also often used as a light seal where the back cover connects to the body of the camera. Movement of the back relative to the body allows the replacement of film. The foam seal provides a mechanism of preventing light from entering any of the cracks between the back and the body. Over time, and especially with frequent operation, this foam often breaks down which is also believed to be problematic.

Accordingly, foam materials have been a nuisance to film camera users in the past. This nuisance is even more problematic with digital cameras since these particles of foam can interfere with digital camera sensors or internal filters resulting in spots on images.

Accordingly, a need exists for an improved light seal.

Another need exists for an improved mirror bumper.

SUMMARY OF THE INVENTION

It is an object of the present invention to provide an improved light seal construction for use with SLR cameras.

It is another object of the present invention to provide an improved mirror cushion construction for use with at least one of SLR and digital cameras.

It is an object of the present invention to provide an improved cushions for use with one of SLR and digital cameras.

It is an object of the present invention to provide a replacement for internal foam components provided with various camera products.

Accordingly, the presently preferred embodiment of the present invention provides a camera having a camera seal constructed of a non-foam material. Specifically, a silicone based seal has been used by the applicant to replace the foam light seal. This material has been found to provide a satisfactory light seal which does not break down and flake apart in a similar manner as the foam has been found to fail by the applicant.

Similarly, the light seal and/or other internal portions of the camera including the mirror cushion and finder cushion can be provided in a form of silicones, silicone rubbers, fabric, or other suitable material which is less susceptible to crumbling as foam which is common with foam disintegration over wear.

Foam is particularly susceptible to degradation over time, repetitive loading and unloading, and exposure to hot and cold extremes. Silicone can be found which remains "elastic like" when subjected to temperatures ranging from −69° F. to over 300° F. It can be made to be a light barrier, moisture barrier, and believed to provide superior functional characteristics over the foam of the prior art. Additionally, although adhesive can be applied to the improved light seal and cushions of the new constructions, the seals and cushions can also be manufactured to be at least partially mechanically retained in a desired position which will make replacement easier for a person performing repairs on the camera.

BRIEF DESCRIPTION OF THE DRAWINGS

The particular features and advantages of the invention as well as other objects will become apparent from the following description taken in connection with the accompanying drawings in which.

DETAILED DESCRIPTION OF THE DRAWINGS

Figure 1:
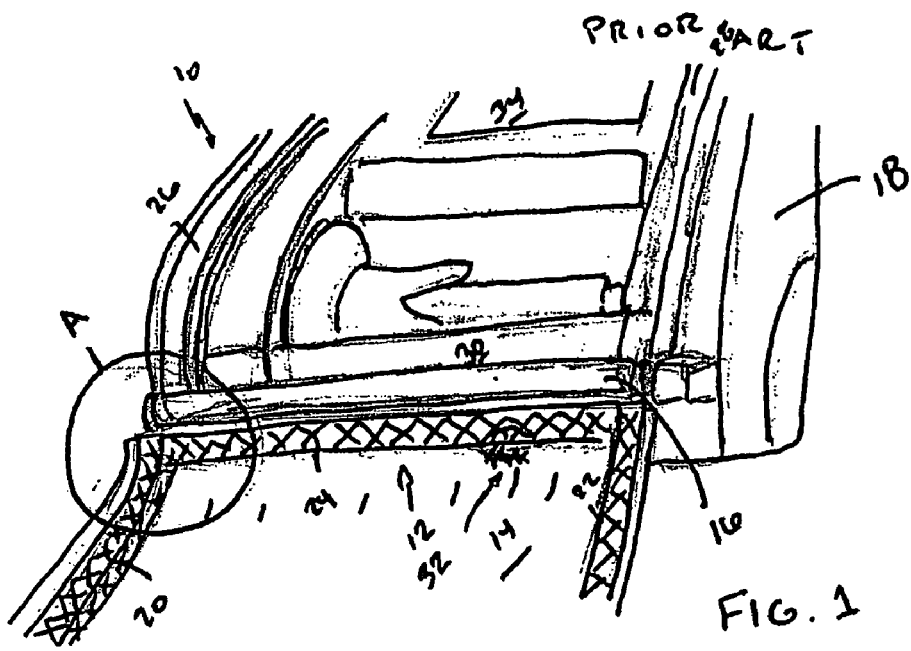
FIG. 1 shows a prior art foam light seal which has deteriorated and needs to be replaced.

FIG. 1 shows prior art single lens reflex (SLR) camera and, in particular, a portion of the light seal 12 which is utilized in camera 10. The light seal 12 is normally connected to the back 14 of the camera which is connected by a hinge 16 to the body 18. When film is inserted into the camera body 18, the back 14 closed. The seal 12, comprised of top and bottom numbers 20,22 as well as side members 24, (the other one is obscured from view) provide a seal with respect to the body 18 and back 14 to prevent light from unintentionally exposing film. The seal members 20,22,24 are believed to be made of rectangular cut foam stock which would typically be foam adhered to the back with an adhesive. The adhesive is normally provided with a tape back. The tape is removed and the member is applied in place of the one that has been removed during the repair process.

The seal members 20,22 may nest at least partially in channel 26,28 and the other seal 24 may rest in channel 30 in some embodiments when the back 14 is closed on the body 18. It is anticipated that the seal members 20,22,24 are somewhat resilient in they partially deflect in a sealed configuration with the back 14 secured to the body 18 in a closed configuration as would be understood by those skilled in the art.

Figure 2:
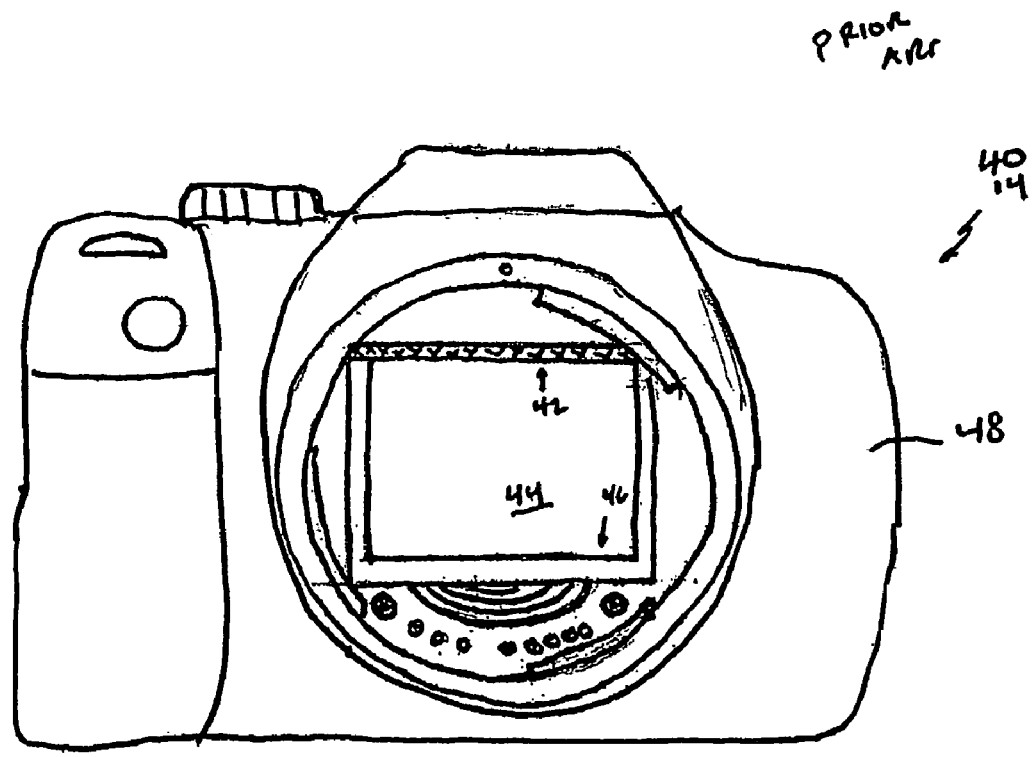
FIG. 2 shows a prior art mirror bumper.

FIG. 2 shows a portion of a camera body 40 of a prior art design having a foam mirror cushion 42. When taking a picture either with an SLR or a digital camera, mirror 44 rotates upwardly where a lower portion 46 contacts the mirror cushion 42. The mirror moves out of the way of either of the film with the shutter open or a digital sensor for use with digital cameras taking digital photographs.

Figure 3:
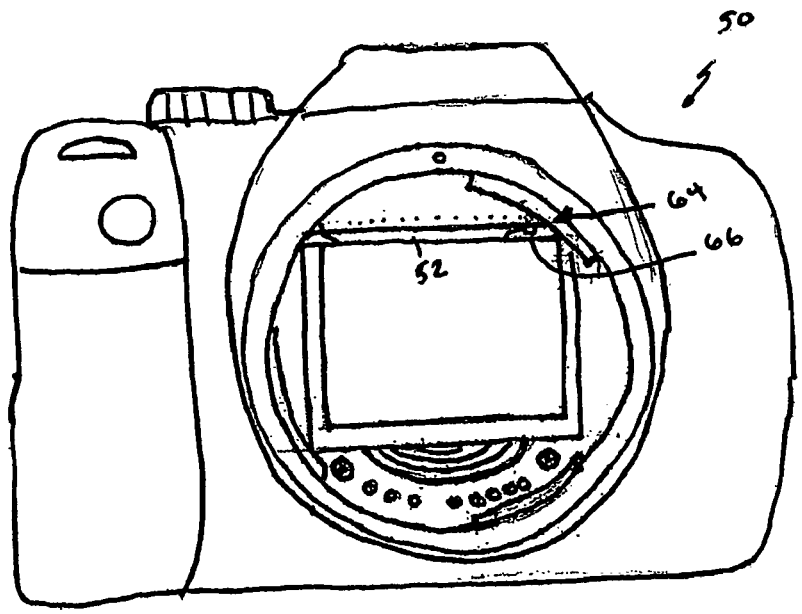
FIG. 3 shows a camera having a mirror bumper constructed in the presently preferred embodiment of the present invention.

FIG. 3 shows a camera body 50 of the presently preferred embodiment of the present invention whether a digital or an SLR camera. The camera has an improved mirror cushion 52 which is not constructed of cut rectangular foam as has been known in the prior art. As will be utilized throughout this application, a "silicon-style resilient" member whether a seal or a mirror cushion is explicitly defined as "a non-foam member constructed of at least one of a silicon, a silicon rubber and/or a rubber". In certain embodiments, such members are preferably non-porous (which further distinguishes them from prior art foam, they exhibit resiliency below zero degrees Celcius and above 100 degrees celcius without rapid break down, and have a number of other beneficial characteristics.

In the prior art, the mirror cushion 42 along with the seals 12 is prone to degradation as described above. Heat occurring from leaving a camera in a car during summer or other situations is prone to accelerate or degradation of the foam. Furthermore, repeated use such as by repeated compressions and relaxation of the foam also is believed to assist in degradation of the foam. Over time, foam crumbles 32 or similar or different degraded portions would occur with respect to the foam mirror cushion 42 shown in FIG. 2 thereby causing foam particles to drift around within the body 18,48 of the cameras 10,40. This presents problems.

If the foam seal 12 were to contact the film or get displaced within the shutter 34, it may cause spots on images. In the context of the mirror bumper 42, foam disintegrating could result in particles alight within the shutter and/or on a digital sensor thereby permanently adversely affecting the quality of images taken by a photographer. The mirror could also be scratched since the cushion 42 is deteriorating. By replacing the mirror cushion 42 with the improved mirror cushion 52, this problem can been addressed.

Figure 4:
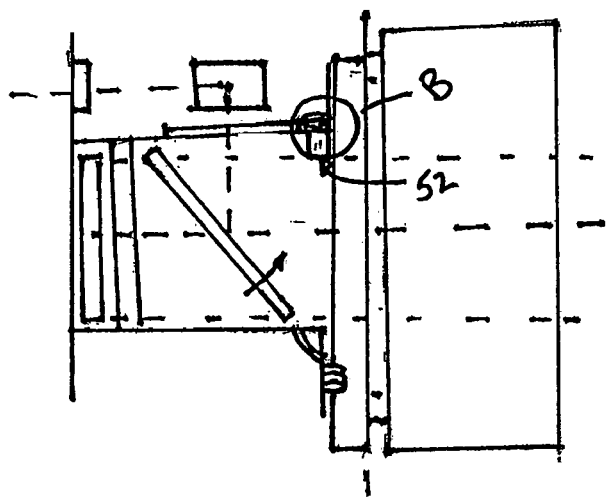
FIG. 4 shows a cross-sectional view of the camera shown in FIG. 3.
Figure 5:
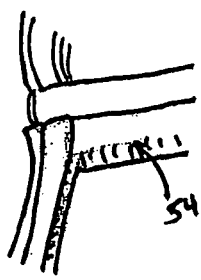
FIG. 5 shows a detail of the area marked A in FIG. 1 with a light seal of the presently preferred embodiment of the present invention installed in a camera.

The improved mirror cushion 52 as shown in FIGS. 3 and 4 is not a traditional foam cushion. This improved mirror cushion 52 and improved light seal 54 as shown in FIG. 5 are comprised of at least one of a silicone material, a silicone rubber material, a rubber material, a fabric material, a silicone based material, or other appropriate material configured to provide a cushioning effect when used as a mirror cushion or other type of cushion within the body of the camera without having the undesired effects of foam. These new materials may be formed and/or shaped in a waffle, wavy, grid, porous, solid and/or semi-solid configuration.

The chemistry of silicone makes it a presently preferred substitute for the foam cushion 42 and foam light seal 12. Silicone is extremely resistant to heat and cold as well as to an array of harsh chemicals and oxidizing agents. Most silicones will not harden, crumble, or discolor. Most silicones are also flame and fungus retardant, are generally non-corrosive and provide a light, sound and moisture barrier as well as providing a cushioning effect. Furthermore, silicone can be versatile in terms of conductivity and can be custom compounded for both thermal and electrical requirements. Silicone can remain elastic like when subjected to temperatures in various ranges including from almost negative 100° F. to over 300° F. It can also be produced in various strengths and resiliencies and is adaptable to various molding methods and techniques.

Standard foam has a much lower heat tolerance. In fact, it can degrade to provide a black goo as has been observed by many oozing from foam in many prior art designs which is difficult to remove. Cameras can be subject to heat as in common warehouse storage, in freight transport and in non-air conditioned vehicles, or even in the trunk of a car, etc., to unknowingly accelerate foam degradation.

Figure 6:
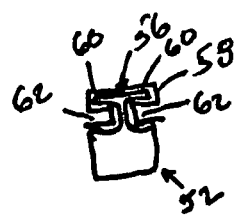
FIG. 6 shows a detail of the area marked B in FIG. 4.

In addition to the possibility of using adhesives to connect the replacement cushion 52 and seal 54 to the body 18 and/or back 14, it is also possible to include mechanical connections for connecting the cushion 52 and light seal 54 to the camera. Specifically, in the design shown in FIGS. 3, 4, and 6, the cushion 52 is equipped with a foot 56 which is at least partially entrapped within slot 58. The legs 60 are thus entrapped by the ledges 62 to retain the cushion 52 in the desired location. Additionally, it is anticipated that the slot 58 be open at one end 64 as shown in FIG. 3 so that the seal 52 and/or seal 54 can be slid into the desired location. In the embodiment shown in FIG. 3 a fastener such as a screw 66 can then placed at an appropriate location into the body to retain the cushion 52 at a desired location. A bore may be located through a portion of the cushion 52 or seal 54 or the fastener may cooperate with an end in an appropriate manner. Other mechanical retention systems could also be utilized in place of or in addition to adhesives. The leg 56 could also be made to wedge or other desirable design.

It is believed to be an advantage to remove adhesive backed components from within the body of a camera such as when replacing the seals 12 and cushion 42. Adhesives have been difficult to remove in some camera designs.

In addition to using the improved design for mirror cushions 52 and light seal 54, other portions such as range finder cushions that are currently made of foam can be replaced with similar constructions as shown and described herein.

The concept of substituting the foam and/or adhesives with improved products is believed to be an important leap over prior art as this improvement is believed to eliminate loose particles in the camera thus saving time and expense which would otherwise be required in retouching images. It could also eliminate the annoying fragments and particles from entering other areas of the camera such as becoming lodged or visible in the camera mirror, camera focusing screen, or anywhere within the optical viewing or taking image areas.

By providing a camera with the slot 58 and the improved seal 52 as shown and described herein, the time, expense, inconvenience and camera down time of cleaning and removing spent cushions 52 can be drastically lessened.

Existing cameras can be provided with cushions 52 and seals 54 which are constructed to cooperate with the existing structure of the camera (i.e., it is likely that they may use adhesive to retain them in place as the prior art foam designs had).

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

The invention claimed is:

1. An improved camera comprising:
  a camera body hingedly connected to a back wherein the back opens relative to the camera body to access an interior portion of the camera, and said back being normally closed relative to the camera body during normal camera operations;

a mirror located internal to the body, said mirror operably coupled to move from a first position to a second position in conjunction with a process for capturing an image with the camera on one of film and through a digital sensor;

a non-foam silicon seal, said silicon seal at least assisting in forming a light barrier when the back is closed relative to the camera body preventing light from entering the interior portion of the camera; and a non-foam silicon mirror cushion which contacts the mirror when the mirror is in the second position;

wherein at least one of the silicon seal and silicon mirror cushion has at least one leg and is retained in a slot with at least one ledge extending into the slot with the ledge extending over the leg mechanically retaining the leg in the slot.

2. An improved camera comprising:

a camera body hingedly connected to a back wherein the back opens relative to the camera body to access an interior portion of the camera, and said back being normally closed relative to the camera body during normal camera operations; and a non-foam silicon seal, said silicon seal at least assisting in forming a light barrier when the back is closed relative to the camera body preventing light from entering the interior portion of the camera;

wherein the silicon seal has at least one leg and is retained in a slot with at least one ledge extending into the slot over the leg thereby mechanically retaining the leg in the slot.

3. The improved camera of claim 2 wherein the silicon seal provides a moisture barrier.

4. The improved camera of claim 2 wherein the silicon seal is resilient at temperatures below zero degrees Celsius.

5. The improved camera of claim 2 wherein the silicon seal is resilient at temperatures exceeding one hundred degrees Celsius.

6. The improved camera of claim 2 further comprising opposing ledges extending into the slot which assist in retaining opposing feet in the slot.

7. The improved camera of claim 2 further comprising at least one fastener which at least assists in retaining the silicon seal in the slot.

8. The improved camera of claim 2 wherein the silicon-like resilient seal is provided in a solid configuration, and the camera further comprising:

a mirror located internal to the body, said mirror operably coupled to move from a first, position to a second position in conjunction with a process for capturing an image with the camera on one of film and through a digital sensor; and a silicon mirror cushion which contacts the mirror when the mirror is in the second position.

9. The improved camera of claim 8 wherein the silicon mirror cushion has at least one leg and is retained in a slot with at least one ledge extending into the slot over the leg thereby mechanically retaining the leg in the slot.

10. An improved camera comprising:

a mirror located internal to the body, said mirror operably coupled to move from a first position to a second position in conjunction with a process for capturing an image with the camera on one of film and through a digital sensor; and a non-foamed silicon mirror cushion which contacts the mirror when the mirror is in the second position;

wherein the silicon mirror cushion has at least one leg and is retained in a slot with at least one ledge extending into the slot over the leg thereby mechanically retaining the leg in the slot.

11. The improved camera of claim 10 wherein the silicon mirror cushion has at least two feet, and at least one of the back and body has the slot therein which receives the feet therein to at least partially assist in retaining the silicon-like resilient mirror cushion securely connected to the camera with at least one ledge extending into the slot over at least one of the feet.

12. The improved camera of claim 11 wherein the silicon-like resilient mirror cushion is mechanically retained in the slot with opposing ledges.

13. The improved camera of claim 12 further comprising at least one fastener which at least assists in retaining the silicon-like resilient mirror cushion in the slot.

* * * * *